United States Patent
Rana

(10) Patent No.: US 11,356,018 B2
(45) Date of Patent: Jun. 7, 2022

(54) CHARGE PUMP CIRCUIT CONFIGURED FOR POSITIVE AND NEGATIVE VOLTAGE GENERATION

(71) Applicant: STMicroelectronics International N.V., Geneva (CH)

(72) Inventor: Vikas Rana, Noida (IN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 17/313,533

(22) Filed: May 6, 2021

(65) Prior Publication Data

US 2021/0281172 A1    Sep. 9, 2021

Related U.S. Application Data

(63) Continuation of application No. 16/911,967, filed on Jun. 25, 2020, now Pat. No. 11,031,865.

(60) Provisional application No. 62/885,533, filed on Aug. 12, 2019.

(51) Int. Cl.
    *H02M 3/07* (2006.01)
(52) U.S. Cl.
    CPC ............ *H02M 3/073* (2013.01); *H02M 3/076* (2021.05)
(58) Field of Classification Search
    None
    See application file for complete search history.

(56) References Cited

U.S. PATENT DOCUMENTS

| | | |
|---|---|---|
| 6,359,947 B1 | 3/2002 | Rao |
| 6,366,158 B1 | 4/2002 | Zeng et al. |
| 6,429,723 B1 | 8/2002 | Hastings |
| 6,452,438 B1 | 9/2002 | Li |
| 6,496,055 B2 | 12/2002 | Li |
| 6,646,493 B2 | 11/2003 | Butler |
| 6,686,793 B2 | 2/2004 | Li |
| 7,002,399 B2 | 2/2006 | Nuzzarello et al. |
| 7,342,438 B2 | 3/2008 | Muneer et al. |
| 8,049,553 B2 | 11/2011 | Kim et al. |
| 8,362,824 B2 | 1/2013 | Wong et al. |
| 9,673,713 B2 | 6/2017 | Kovacic et al. |
| 10,050,524 B1 | 8/2018 | Rana |
| 10,250,133 B2 | 4/2019 | Rana |
| 10,811,960 B2 | 10/2020 | Rana |
| 2019/0123638 A1 | 4/2019 | Rana |

*Primary Examiner* — Jeffery S Zweizig
(74) *Attorney, Agent, or Firm* — Crowe & Dunlevy

(57) ABSTRACT

A charge pump includes an intermediate node capacitively coupled to receive a first clock signal oscillating between a ground and positive supply voltage, the intermediate node generating a first signal oscillating between a first and second voltage. A level shifting circuit shifts the first signal in response to a second clock signal to generate a second signal oscillating between first and third voltages. A CMOS switching circuit includes a first transistor having a source coupled to an input, a second transistor having a source coupled to an output and a gate coupled to receive the second signal. A common drain of the CMOS switching circuit is capacitively coupled to receive the first clock signal. When positively pumping, the first voltage is twice the second voltage and the third voltage is ground. When negatively pumping, the first and third voltages are of opposite polarity and the second voltage is ground.

36 Claims, 11 Drawing Sheets

CHARGE PUMP CIRCUIT CONFIGURED FOR POSITIVE AND NEGATIVE VOLTAGE GENERATION

CROSS REFERENCE TO RELATED APPLICATION

This application is a continuation of U.S. application for patent Ser. No. 16/911,967, filed Jun. 25, 2020, which claims priority from U.S. Provisional Application for Patent No. 62/885,533 filed Aug. 12, 2019, the disclosures of which are incorporated by reference.

TECHNICAL FIELD

The present invention relates to charge pump circuits configured to generate positive and negative voltages.

BACKGROUND

Reference is made to FIG. 1A showing a circuit diagram for a positive charge pump circuit 100p. The circuit 100p includes an n-channel MOS transistor MN1 having a source terminal coupled to supply node 102 and a drain terminal coupled to intermediate node NA1 and an n-channel MOS transistor MN2 having a source terminal coupled to supply node 102 and a drain terminal coupled to intermediate node NA2. The circuit 100p further includes a p-channel MOS transistor MP1 having a source terminal coupled to output node 104 and a drain terminal coupled to node NA1 and a p-channel MOS transistor MP2 having a source terminal coupled to output node 104 and a drain terminal coupled to intermediate node NA2. The gate terminals of transistors MN1 and MP1 are connected together and further connected to intermediate node NA2. The gate terminals of transistors MN2 and MP2 are connected together and further connected to intermediate node NA1. The transistors MN1, MN2, MP1 and MP2 form a CMOS latch circuit.

A capacitor C1 has one terminal coupled to node NA1 and another terminal coupled to receive the logical inversion of a clock signal CK, that logical inversion being generated by a CMOS inverter circuit 106 powered from a positive supply voltage Vdd and receiving clock signal CK as an input. A capacitor C2 has one terminal coupled to node NA2 and another terminal coupled to receive a logical inversion of a clock signal CKN (which is a logical inversion of the clock signal CK), that logical inversion being generated by a CMOS inverter circuit 108 powered from the positive supply voltage Vdd and receiving clock signal CKN as an input.

A load 106 of the circuit 100p is schematically represented by a load capacitor Cload having one terminal coupled to output node 104 and a second terminal coupled to a ground node and a current source Iload coupled between output node 104 and the ground node.

The supply node 102 is configured to receive the positive supply voltage Vdd. The output node 104 is configured to generate a multiplied positive output voltage Vpos, where Vpos is approximately 2*Vdd.

Reference is made to FIG. 1B showing a circuit diagram for a negative charge pump circuit 100n. The circuit 100n includes a p-channel MOS transistor MP1 having a source terminal coupled to supply node 102 and a drain terminal coupled to intermediate node NA1 and a p-channel MOS transistor MP2 having a source terminal coupled to supply node 102 and a drain terminal coupled to intermediate node NA2. The circuit 100n further includes an n-channel MOS transistor MN1 having a source terminal coupled to output node 104 and a drain terminal coupled to intermediate node NA1 and an n-channel MOS transistor MN2 having a source terminal coupled to output node 104 and a drain terminal coupled to intermediate node NA2. The gate terminals of transistors MN1 and MP1 are connected together and further connected to intermediate node NA2. The gate terminals of transistors MN2 and MP2 are connected together and further connected to intermediate node NA1. The transistors MN1, MN2, MP1 and MP2 form a CMOS latch circuit.

A capacitor C1 has one terminal coupled to node NA1 and another terminal coupled to receive the logical inversion of a clock signal CK, that logical inversion being generated by a CMOS inverter circuit 106 powered from a positive supply voltage Vdd and receiving clock signal CK as an input. A capacitor C2 has one terminal coupled to node NA2 and another terminal coupled to receive a logical inversion of a clock signal CKN (which is a logical inversion of the clock signal CK), that logical inversion being generated by a CMOS inverter circuit 108 powered from the positive supply voltage Vdd and receiving clock signal CKN as an input.

A load 106 of the circuit 100n is schematically represented by a load capacitor Cload having one terminal coupled to output node 104 and a second terminal coupled to a ground node and a current source Iload coupled between the positive supply voltage Vdd and output node 104.

The supply node 102 is configured to receive the ground voltage Vgnd. The output node 104 is configured to generate a multiplied negative output voltage Vneg, where Vneg is approximately equal to −Vdd.

The output impedance at output node 104 depends on the frequency of the clock signals CK and CKN and the on-resistance (Rds_on) of the switching transistors MN1, MN2, MP1 and MP2 performing the charge transfer. The output impedance is given by the following formula:

$$R_{out} = \frac{1}{(f_{CLK} * C)} + R_{ds\_on}$$

where: C is the capacitance of the flying capacitor (i.e., C1 or C2 depending on phase of the clock).

The on-resistance (Rds_on) of the transistors MN1, MN2, MP1 and MP2 is given by the following formula:

$$R_{ds\_on} = \frac{L}{(\mu C_{OX} W (V_{GS} - V_{TH}))}$$

where: L is the length of the transistor, W is the width of the transistor, $C_{OX}$ is gate capacitance, $V_{GS}$ is the gate to source voltage, and $V_{TH}$ is the threshold voltage.

If the transistor width W is decreased, the on-resistance (Rds_on) increases and there will be a larger voltage drop across each switching transistor, with a corresponding decrease in efficiency.

The switch capacitance is given by the formula:

$$C_{SW} = C_{OX} * W * L_{eff}$$

where: $L_{eff}$ is the effective length of the transistor switches.

It will be noted that if the transistor width W is increased, this will result in an increase of the capacitance on the upper plate of the capacitor, with a corresponding increase in charge loss and reduction of efficiency.

There is accordingly a need for a positive/negative charge pump circuit that addresses the drawbacks of the circuits 100p/100n shown in FIGS. 1A and 1B.

SUMMARY

In an embodiment, a charge pump circuit comprises: an input voltage node; an output voltage node; a first transistor and a second transistor in a cross-coupled configuration, wherein the first transistor is coupled between the input voltage node and a first intermediate node and the second transistor is coupled between the input voltage node and a second intermediate node; wherein the first and second intermediate nodes are capacitively coupled to receive first and second clock signals that are logical inverses of each other; a first CMOS switching circuit including a first transistor having a source node coupled to receive a first signal at the first intermediate node and a second transistor having a source node coupled to receive a third clock signal, wherein the second clock signal is a logical inverse of the third clock signal; a second CMOS switching circuit including a third transistor having a source node coupled to receive a second signal at the second intermediate node and a fourth transistor having a source node coupled to receive a fourth clock signal, wherein the first clock signal is a logical inverse of the fourth clock signal; a third CMOS switching circuit including a fifth transistor having a source node coupled to the input node, a sixth transistor having a source node coupled to the output node, and wherein a gate node of at least one of the fifth and sixth transistors is coupled to receive a third signal at a common drain of the first CMOS switching circuit; a fourth CMOS switching circuit including a seventh transistor having a source node coupled to the input node, an eighth transistor having a source node coupled to the output node, and wherein a gate node of at least one of the seventh and eighth transistors is coupled to receive a fourth signal at a common drain of the second CMOS switching circuit; wherein a common drain of the third CMOS switching circuit and a common drain of the fourth CMOS switching circuit are capacitively coupled to respectively receive the first and second clock signals.

In an embodiment, a charge pump circuit comprises: first and second intermediate nodes that are capacitively coupled to receive first and second clock signals that are logical inverses of each other, said first and second clock signals oscillating between a ground voltage and a positive supply voltage, the first and second intermediate nodes generating a first signal and a second signal, respectively, that are logical inverses of each other and which oscillate between a first voltage and a second voltage; a first level shifting circuit configured to shift the first signal and generate a third signal oscillating between the first voltage and a third voltage; a second level shifting circuit configured to shift the second signal and generate a fourth signal oscillating between the first voltage and the third voltage, wherein the third and fourth signals are logical inverses of each other; a first CMOS switching circuit including a first transistor having a source node coupled to an input node, a second transistor having a source node coupled to an output node, and wherein a gate node of at least one of the first and second transistors is coupled to receive the third signal, wherein a common drain of the first CMOS switching circuit is capacitively coupled to receive the first clock signal; and a second CMOS switching circuit including a third transistor having a source node coupled to the input node, a fourth transistor having a source node coupled to the output node, and wherein a gate node of at least one of the third and fourth transistors is coupled to receive the fourth signal, wherein a common drain of the second CMOS switching circuit is capacitively coupled to receive the second clock signal.

In an embodiment, a positive charge pump circuit comprises: a bootstrap-based level shifting circuit receiving a positive supply voltage at an input node and configured to generate a switching control signal that oscillates between a ground voltage and a boosted positive voltage that is substantially equal to two times the positive supply voltage; a circuit including an intermediate node capacitively coupled to receive a clock signal oscillating between a ground voltage and the positive supply voltage and configured to generate a signal at the intermediate node that oscillates between a voltage substantially equal to the positive supply voltage and a voltage substantially equal to two times the positive supply voltage; and a charge transfer switching circuit having a control node driven by the switching control signal and configured to control transfer of charge from the intermediate node to an output node for generating an output voltage that is substantially equal to two times the positive supply voltage.

In an embodiment, a negative charge pump circuit comprises: a bootstrap-based level shifting circuit receiving a ground voltage at an input node and configured to generate a switching control signal that oscillates between a ground voltage and a boosted negative voltage that is substantially equal to a negative of a positive supply voltage; a circuit including an intermediate node capacitively coupled to receive a clock signal oscillating between a ground voltage and the positive supply voltage and configured to generate a signal at the intermediate node that oscillates between a voltage substantially equal to the positive supply voltage and a voltage substantially equal to the negative of the positive supply voltage; and a charge transfer switching circuit having a control node driven by the switching control signal and configured to control transfer of charge from the intermediate node to an output node for generating an output voltage that is substantially equal to the negative of the positive supply voltage.

In an embodiment, a charge pump circuit comprises: an input voltage node; an output voltage node; a first intermediate node capacitively coupled to receive a first clock signal; a second intermediate node capacitively coupled to receive a second clock signal; a first switching circuit including a first transistor having a source node coupled to receive a first signal at the first intermediate node and a second transistor having a source node coupled to receive a third clock signal, wherein the second clock signal is a logical inverse of the third clock signal; a second switching circuit including a third transistor having a source node coupled to receive a second signal at the second intermediate node and a fourth transistor having a source node coupled to receive a fourth clock signal, wherein the first clock signal is a logical inverse of the fourth clock signal; a third switching circuit including a fifth transistor having a source node coupled to the input node, a sixth transistor having a source node coupled to the output node, and wherein a gate node of at least one of the fifth and sixth transistors is coupled to receive a third signal at a common drain of the first switching circuit, wherein a common drain of the third switching circuit is capacitively coupled to respectively receive the first clock signal; and a fourth switching circuit including a seventh transistor having a source node coupled to the input node, an eighth transistor having a source node coupled to the output node, and wherein a gate node of at least one of the seventh and eighth transistors is coupled to receive a fourth signal at a common drain of the second switching circuit, wherein a common drain of the fourth switching circuit is capacitively coupled to receive the second clock signal.

BRIEF DESCRIPTION OF THE DRAWINGS

For a better understanding of the embodiments, reference will now be made by way of example only to the accompanying figures in which.

DETAILED DESCRIPTION

Figure 2A:
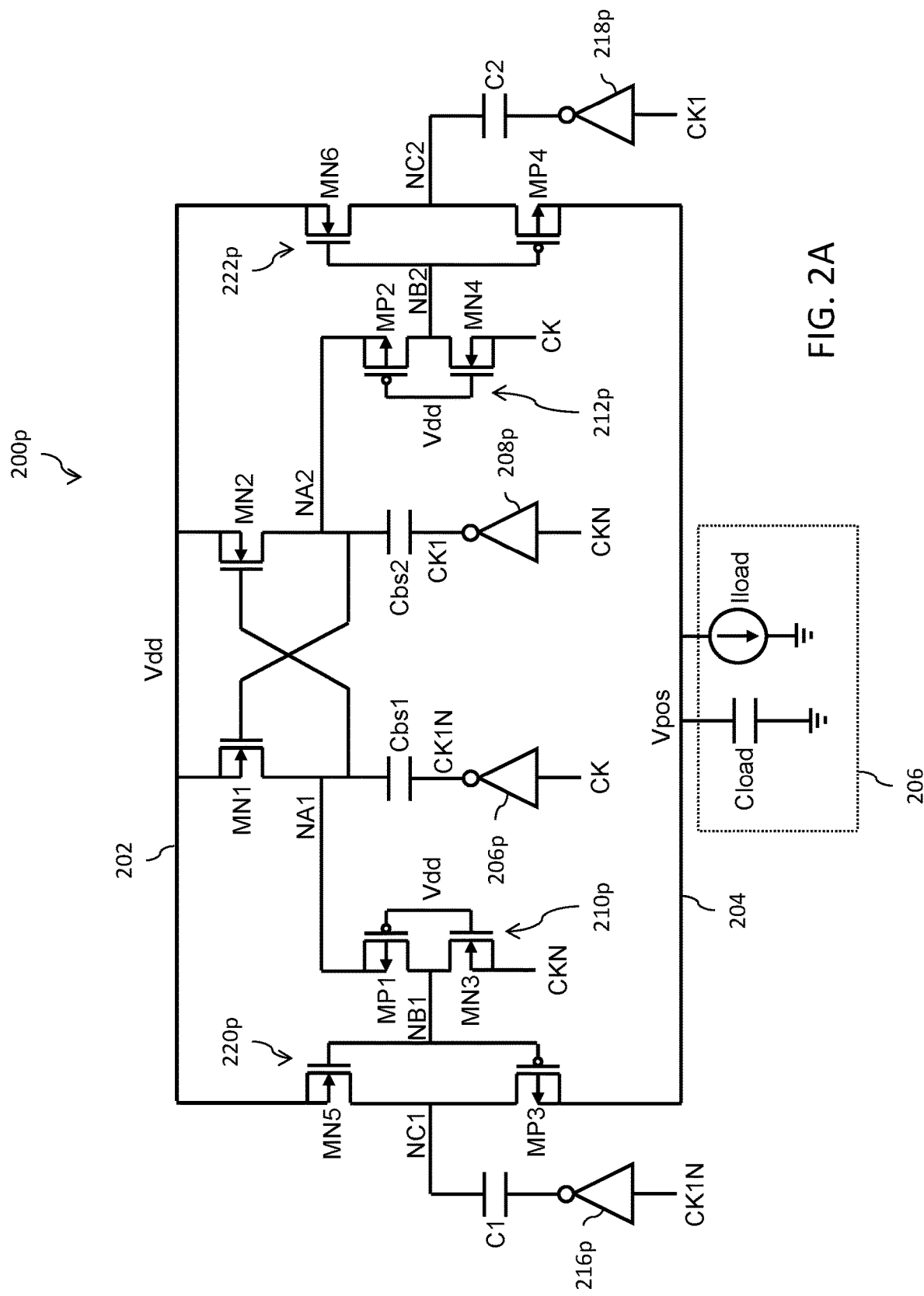
FIG. 2A is a circuit diagram for a positive charge pump circuit.

Reference is now made to FIG. 2A which shows a circuit diagram for a positive charge pump circuit 200p. The circuit 200p includes a bootstrapping circuit including an n-channel MOS transistor MN1 having a source terminal coupled to supply node 202 and a drain terminal coupled to intermediate node NA1 and an n-channel MOS transistor MN2 having a source terminal coupled to supply node 202 and a drain terminal coupled to intermediate node NA2. The transistors MN1 and MN2 are cross-coupled with the gate terminal of transistor MN1 coupled to the drain terminal of transistor MN2 at node NA2 and the gate terminal of transistor MN2 coupled to the drain terminal of transistor MN1 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 206p powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 208p powered from the positive supply voltage Vdd and receiving clock signal CKN as an input.

A CMOS switching circuit 210p has a first terminal coupled to receive the positive supply voltage Vdd and a second terminal at intermediate node NB1. A source terminal of the p-channel MOS transistor MP1 in switching circuit 210p is coupled to the node NA1 and a source terminal of the n-channel MOS transistor MN3 in switching circuit 210p is coupled to receive the clock signal CKN. The second terminal is at the common drains of transistors MP1 and MN3. The gates of transistors MP1 and MN3 are coupled to the first terminal (Vdd).

A CMOS switching circuit 212p has a first terminal coupled to receive the positive supply voltage Vdd and a second terminal at intermediate node NB2. A source terminal of the p-channel MOS transistor MP2 in switching circuit 212p is coupled to the node NA2 and a source terminal of the n-channel MOS transistor MN4 in switching circuit 212p is coupled to receive the clock signal CK. The second terminal is at the common drains of transistors MP2 and MN4. The gates of transistors MP2 and MN4 are coupled to the first terminal (Vdd).

The circuits 210p and 212p with the bootstrapping circuit form a bootstrap-based level shifting circuit.

A CMOS switching circuit 220p has a first terminal coupled to node NB1 and a second terminal at intermediate node NC1. A source terminal of the n-channel MOS transistor MN5 in switching circuit 220p is coupled to supply node 202 and a source terminal of the p-channel MOS transistor MP3 in switching circuit 220p is coupled to output node 204. The second terminal is at the common drains of transistors MN5 and MP3. The gate terminals of the transistors MN5 and MP3 are coupled to the first terminal (NB1).

A CMOS switching circuit 222p has a first terminal coupled to node NB2 and a second terminal at intermediate node NC2. A source terminal of the n-channel MOS transistor MN6 in switching circuit 222p is coupled to supply node 202 and a source terminal of the p-channel MOS transistor MP4 in switching circuit 222p is coupled to output node 204. The second terminal is at the common drains of transistors MN6 and MP4. The gate terminals of the transistors MN6 and MP4 are coupled to the first terminal (NB2).

A capacitor C1 has one terminal coupled to node NC1 and another terminal coupled to receive the logical inversion of the clock signal CK1N, that logical inversion being generated by a CMOS inverter circuit 216p powered from the positive supply voltage Vdd and receiving clock signal CK1N as an input. A capacitor C2 has one terminal coupled to node NC2 and another terminal coupled to receive a logical inversion of the clock signal CK1, that logical inversion being generated by a CMOS inverter circuit 218p powered from the positive supply voltage Vdd and receiving clock signal CK1 as an input.

A load 206 of the circuit 200p is schematically represented by a load capacitor Cload having one terminal coupled to output node 204 and a second terminal coupled to a ground node and a current source Iload coupled between output node 204 and the ground node.

The supply node 202 is configured to receive the positive supply voltage Vdd. The output node 204 is configured to generate a multiplied positive output voltage Vpos, where Vpos is approximately 2*Vdd.

Figure 3A:
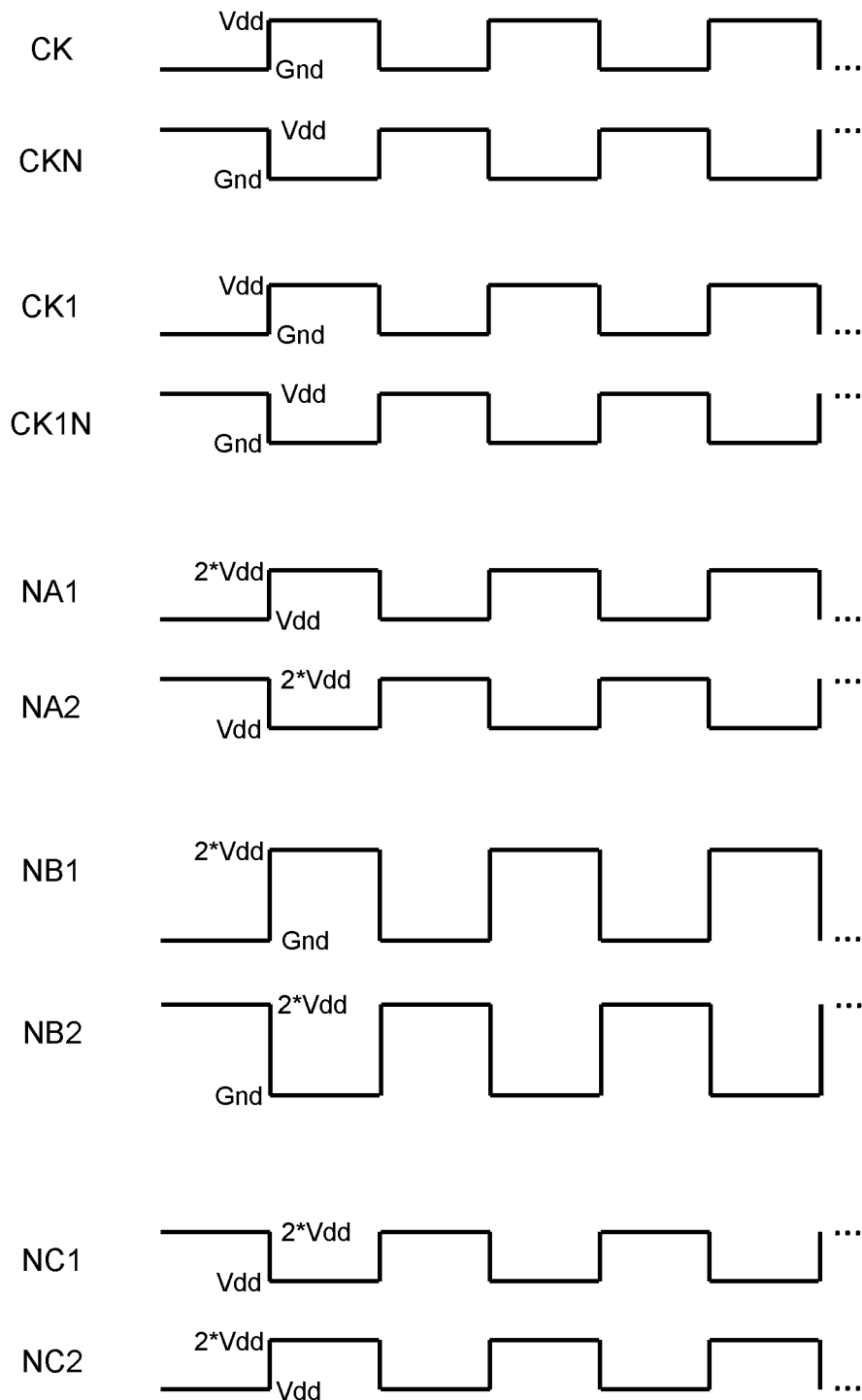
FIG. 3A illustrates operational waveforms for the circuits of FIGS. 2A-2D.

FIG. 3A shows the waveforms for the clock signals CK, CKN, CK1 and CK1N as well as the signals at nodes NA1, NA2, NB1, NB2, NC1 and NC2 for the operation of the circuit 200p of FIG. 2A. It will be noted that, for ease of understanding the operation of the circuit 200p, signal propagation delays are not shown in the FIG. 3A waveforms. It will be further noted that the voltage levels of the clock signals are idealized, and that as implemented the voltages will be substantially equal to (for example, within 1-20%), but not necessarily equal to, the ideal Vdd and 2*Vdd voltage levels.

The circuitry formed by transistors MN1, MN2, bootstrap capacitors Cbs1, Cbs2 and inverters 206p, 208p is a bootstrapping circuit that functions in response to the clock signals CK, CKN referenced to the power supply Vdd and ground to generate clock signals at nodes NA1, NA2 referenced to 2*Vdd and Vdd. When clock signal CK is logic high (Vdd), the clock signal CK1N output by inverter 206p will be logic low (Gnd). Transistor MN1 turns on because node NA2 is boosted through capacitor Cbs2 to the 2*Vdd voltage level (i.e., turned on because the gate voltage of transistor MN1 exceeds Vdd at the source terminal by more than Vth) and the bootstrap capacitor Cbs1 is charged to the Vdd voltage level. In the next phase of the clock signals, the clock signal CK is logic low and clock signal CK1N output by inverter 206p will be logic high. Transistor MN1 turns off because node NA2 is at the Vdd voltage level (i.e., turns off because the gate voltage of transistor MN1 is equal to the source voltage Vdd and thus does not exceed Vth) and the voltage at node NA1 is boosted through the bootstrap voltage Vdd stored on capacitor Cbs1 to the 2*Vdd voltage level. A similar process occurs in response to the phases of the clock signals CKN and CK1.

The circuitry formed by the CMOS switching circuits 210p and 212p functions as a level shifting stage to shift the clock signals at nodes NA1, NA2 referenced to 2*Vdd and Vdd to generate clock signals at nodes NB1, NB2 referenced to 2*Vdd and ground. Consider the following with respect to the circuit 210p operation: when clock signal CKN is logic low, transistor MN3 is turned on (i.e., because the gate voltage of transistor MN3 exceeds ground at the source terminal by more than Vth) and node NB1 is clamped to ground. Transistor MP1 is off because node NB1 is at 2*Vdd level. In the next phase of the clock signals, clock signal CKN is logic high which causes transistor MN3 to turn off (i.e., because the gate voltage of transistor MN3 is equal to the source voltage Vdd and thus does not exceed Vth). In that same phase, node NA1 is at the 2*Vdd voltage level (see, discussion above), and transistor MP1 turns on (i.e., the Vgs of transistor MP1 exceeds the Vth) passing the 2*Vdd voltage level to node NB1. A similar process occurs with respect to the circuit 212p in response to the phases of the clock signal CK.

The circuitry formed by capacitor C1, C2 and inverters 216p, 218p functions in response to the clock signals CK1, CK1N referenced to the power supply Vdd and ground to generate clock signals at nodes NC1, NC2 referenced to 2*Vdd and Vdd. Consider the following operation with respect to the circuit with capacitor C1 and inverter 216p: when clock signal CK1N is logic high, the output of the inverter 216p is logic low. At the same time, as will be discussed below, transistor MN5 is turned on and the capacitor C1 is charged to the Vdd voltage level. In the next phase of the clock signals, clock signal CK1N is logic low, and the output of the inverter 216p is logic high. The voltage at node NC1 is boosted through capacitor C1 to the 2*Vdd voltage level. A similar process occurs with respect to the circuit with capacitor C2 and inverter 218p in response to the phases of the clock signal CK1.

The circuitry formed by the CMOS switching circuits 220p and 222p functions as a charge transfer drive stage to selectively pass the 2*Vdd voltage at nodes NC1, NC2 to the output node 204 in order to drive the capacitive and current load 206. Consider the following with respect to the circuit 220p operation: when clock signals CKN and CK1N are both logic high, the voltage at node NB1 is at the 2*Vdd voltage level and the transistor MN5 is turned on (i.e., the Vgs of transistor MN5 exceeds the Vth) to charge the capacitor C1 to the Vdd voltage level. In the next phase of the clock signals, when clock signals CKN and CK1N are both logic low, the voltage at node NB1 is at the ground level and the transistor MP3 is turned on (i.e., the Vgs of transistor MP3 exceeds the Vth) to pass the 2*Vdd voltage level at node NC1 to the output node 204. A similar process occurs with respect to the circuit 222p in response to the phases of the clock signals CK and CK1.

Figure 1A:
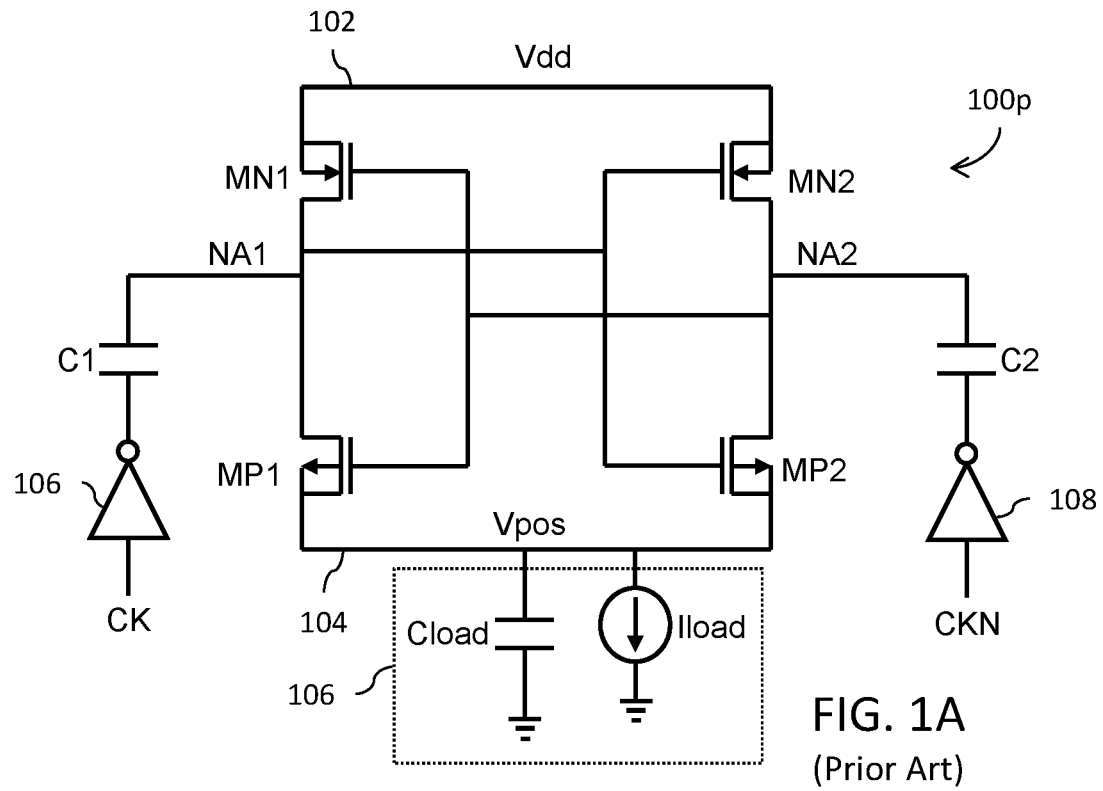
FIG. 1A is a circuit diagram for a positive charge pump circuit.

An advantage of the circuit implementation is an increase in the Vgs of the charge transfer switching transistors in order to reduce the on-resistance (Rds_on). There is a corresponding reduction in the output impedance in comparison to the charge pump circuit of FIG. 1A, for example.

Figure 2B:
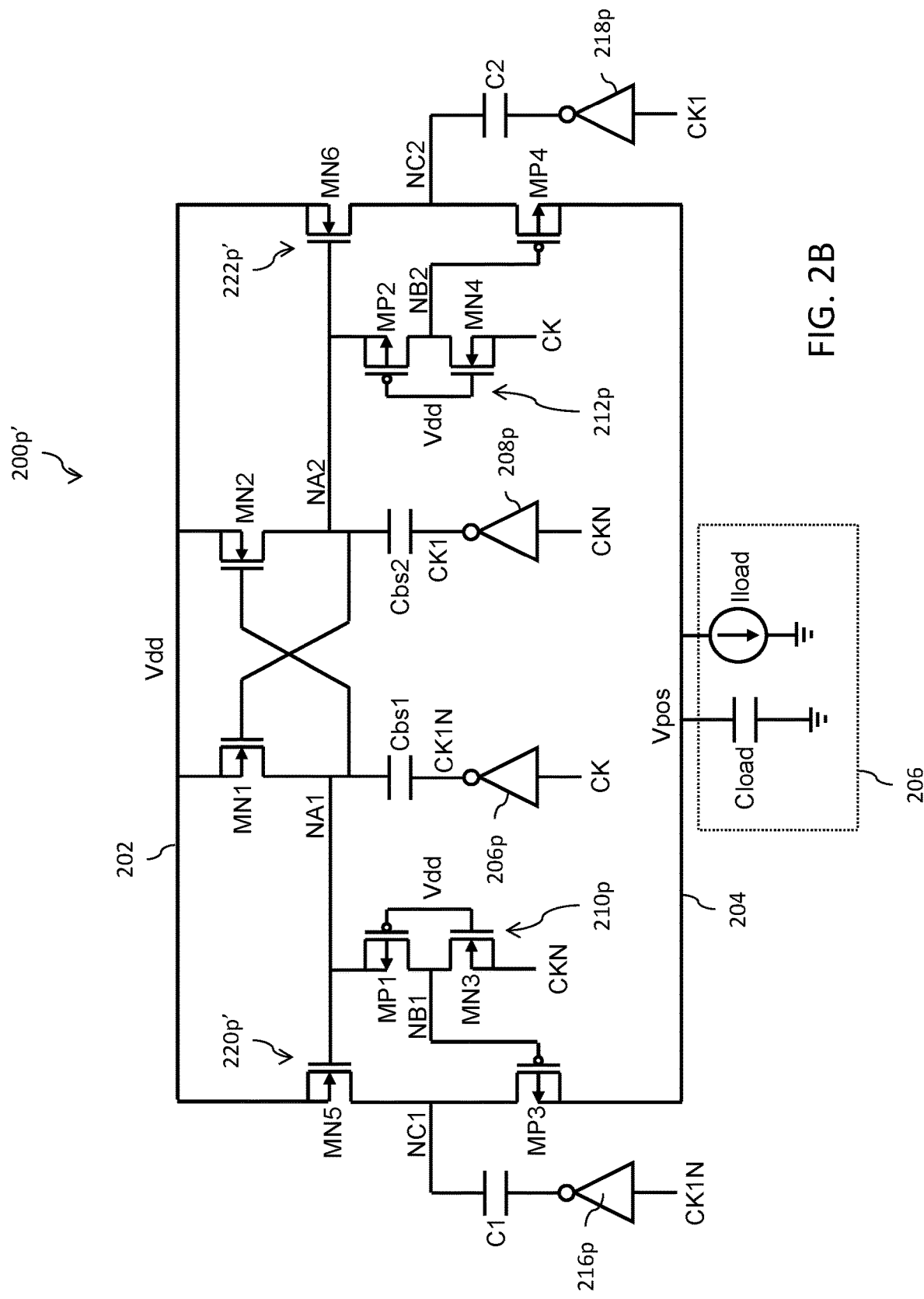
FIG. 2B is a circuit diagram for a positive charge pump circuit.

Reference is now made to FIG. 2B which shows a circuit diagram for a positive charge pump circuit 200p'. Like references refer to like or same components which will not be described again. The circuit 200p' of FIG. 2B differs from the circuit 200p of FIG. 2A in the drive of the CMOS switching circuits 220p' and 222p'. The gate of transistor MP3 is driven by the signal at node NB1, as with the circuit 200p, but the gate of transistor MN5 is driven by the signal at node NA1. The gate of transistor MP4 is driven by the signal at node NB2, as with the circuit 200p, but the gate of transistor MN6 is driven by the signal at node NA2. Operation of the circuit 200p' is like that described for circuit 200p with waveforms as shown in FIG. 3A.

Figure 2C:
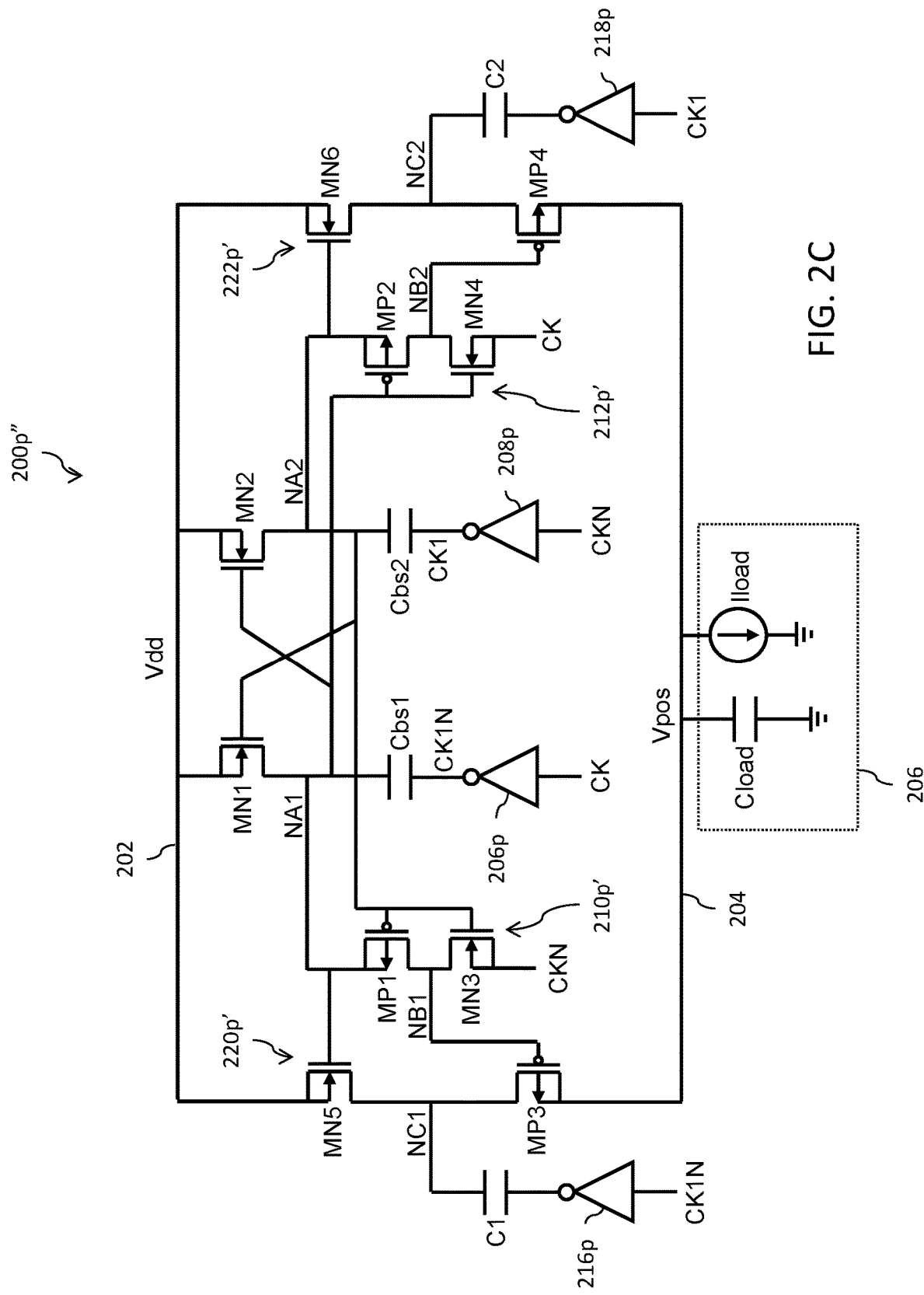
FIG. 2C is a circuit diagram for a positive charge pump circuit.

Reference is now made to FIG. 2C which shows a circuit diagram for a positive charge pump circuit 200p". Like references refer to like or same components which will not be described again. The circuit 200p" of FIG. 2C differs from the circuit 200p' of FIG. 2B in the drive of the CMOS switching circuits 210p' and 212p'. The gates of transistors MN3 and MP1 are driven by the signal at node NA2. The gates of transistors MN4 and MP2 are driven by the signal at node NA1. Operation of the circuit 200p" is like that described for circuit 200p with waveforms as shown in FIG. 3A.

Figure 2D:
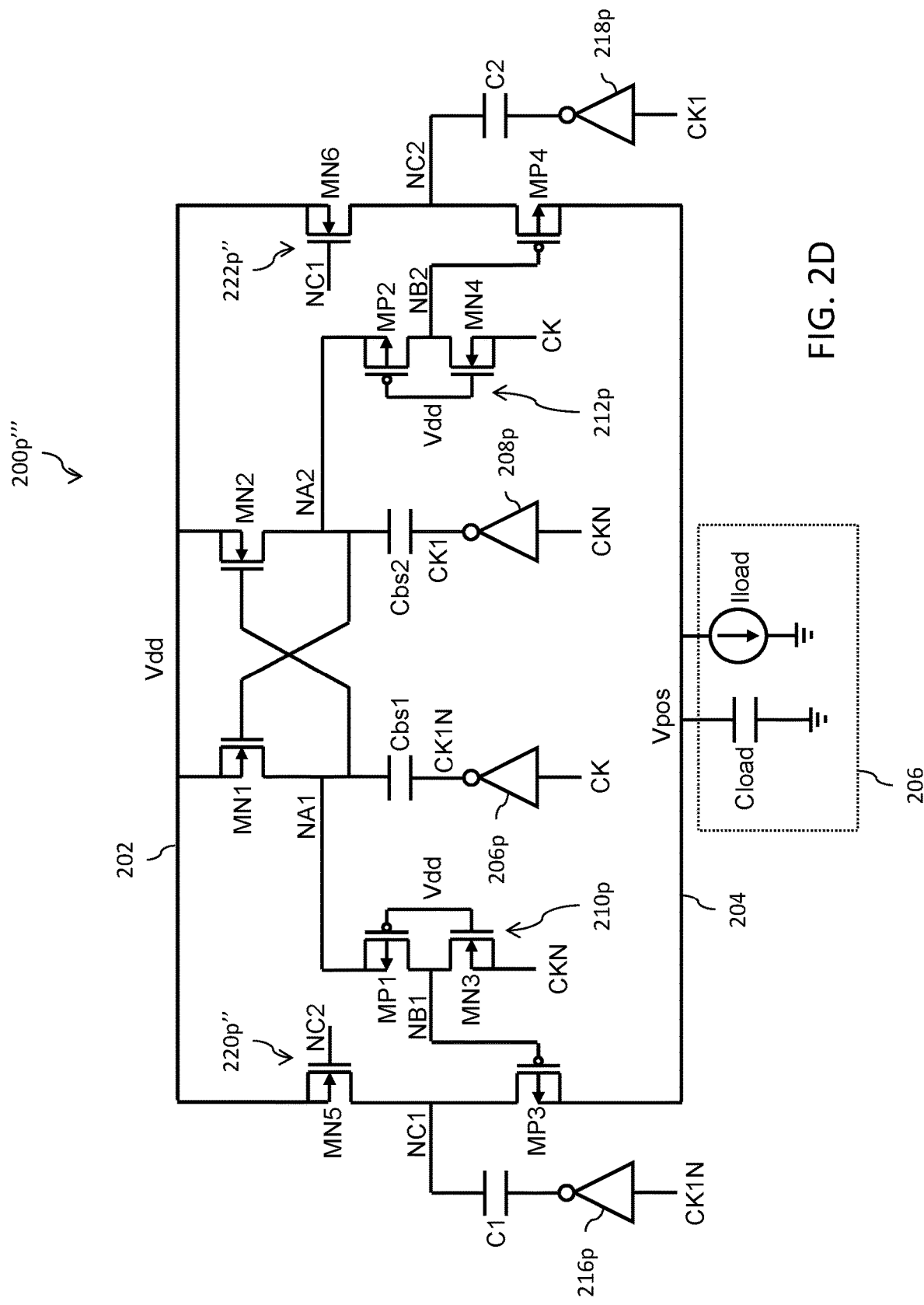
FIG. 2D is a circuit diagram for a positive charge pump circuit.

Reference is now made to FIG. 2D which shows a circuit diagram for a positive charge pump circuit 200p'". Like references refer to like or same components which will not be described again. The circuit 200p'" of FIG. 2D differs from the circuit 200p of FIG. 2A in the drive of the CMOS switching circuits 220p" and 222p". The gate of transistor MP3 is driven by the signal at node NB1, as with the circuit 200p, but the gate of transistor MN5 is driven by the signal at node NC2. The gate of transistor MP4 is driven by the signal at node NB2, as with the circuit 200p, but the gate of transistor MN6 is driven by the signal at node NC1. Operation of the circuit 200p'" is like that described for circuit 200p with waveforms as shown in FIG. 3A.

Figure 2E:
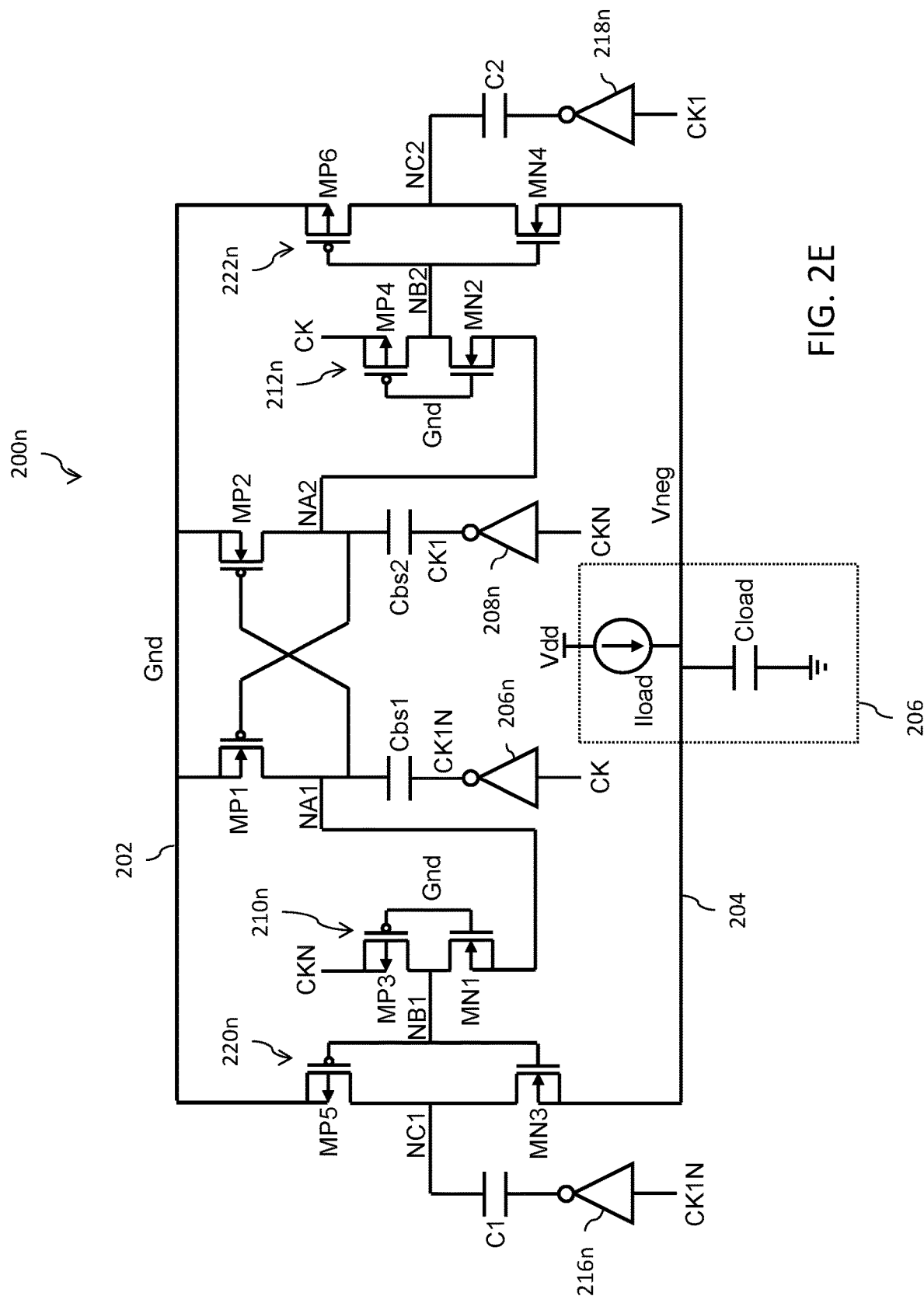
FIG. 2E is a circuit diagram for a negative charge pump circuit.

Reference is now made to FIG. 2E which shows a circuit diagram for a negative charge pump circuit 200n. The circuit 200n includes a bootstrapping circuit including a p-channel MOS transistor MP1 having a source terminal coupled to supply node 202 and a drain terminal coupled to intermediate node NA1 and a p-channel MOS transistor MP2 having a source terminal coupled to supply node 202 and a drain terminal coupled to intermediate node NA2. The transistors MP1 and MP2 are cross-coupled with the gate terminal of transistor MP1 coupled to the drain terminal of transistor MP2 at node NA2 and the gate terminal of transistor MP2 coupled to the drain terminal of transistor MP1 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 206n powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 208n powered from the positive supply voltage Vdd and receiving clock signal CKN as an input.

A CMOS switching circuit 210n has a first terminal coupled to receive the ground voltage Gnd and a second terminal at intermediate node NB1. A source terminal of the p-channel MOS transistor MP3 in switching circuit 210 is coupled to receive the clock signal CKN and a source terminal of the n-channel MOS transistor MN1 in switching circuit 210 is coupled to the node NA1. The second terminal is at the common drains of transistors MP3 and MN1. The gates of transistors MP3 and MN1 are coupled to the first terminal (Gnd).

A CMOS switching circuit 212n has a first terminal coupled to receive the ground voltage Gnd and a second terminal at intermediate node NB2. A source terminal of the p-channel MOS transistor MP4 in switching circuit 212n is coupled to receive the clock signal CK and a source terminal of the n-channel MOS transistor MN2 in switching circuit 212 is coupled to the NA2. The second terminal is at the common drains of transistors MP4 and MN2. The gate terminals of transistors MP4 and MN2 are coupled to the first terminal (Gnd).

The circuits 210n and 212n with the bootstrapping circuit form a bootstrap-based level shifting circuit.

A CMOS switching circuit 220n has a first terminal coupled to node NB1 and a second terminal at intermediate node NC1. A source terminal of the p-channel MOS transistor MP5 in switching circuit 220n is coupled to supply node 202 and a source terminal of the n-channel MOS transistor MN3 in switching circuit 220n is coupled to output node 204. The second terminal is at the common drains of transistors MP5 and MN3. The gates of transistors MP5 and MN3 are coupled to the first terminal (NB1).

A CMOS switching circuit 222n has a first terminal coupled to node NB2 and a second terminal at intermediate node NC2. A source terminal of the p-channel MOS transistor MP6 in switching circuit 222n is coupled to node 202 and a source terminal of the n-channel MOS transistor MN4 in switching circuit 222n is coupled to output node 204. The second terminal is at the common drains of transistors MP6 and MN4. The gates of transistors MP6 and MN4 are coupled to the first terminal (NB2).

A capacitor C1 has one terminal coupled to node NC1 and another terminal coupled to receive the logical inversion of the clock signal CK1N, that logical inversion being generated by a CMOS inverter circuit 216n powered from the positive supply voltage Vdd and receiving the clock signal CK1N as an input. A capacitor C2 has one terminal coupled to node NC2 and another terminal coupled to receive a logical inversion of the clock signal CK1, that logical inversion being generated by a CMOS inverter circuit 218n powered from the positive supply voltage Vdd and receiving clock signal CK1 as an input.

A load 206 of the circuit 200n is schematically represented by a load capacitor Cload having one terminal coupled to output node 204 and a second terminal coupled to a ground node and a current source Iload coupled between the positive supply voltage Vdd and output node 204.

The supply node 202 is configured to receive the ground voltage. The output node 204 is configured to generate a multiplied negative output voltage Vneg, where Vneg is approximately −Vdd.

Figure 3B:
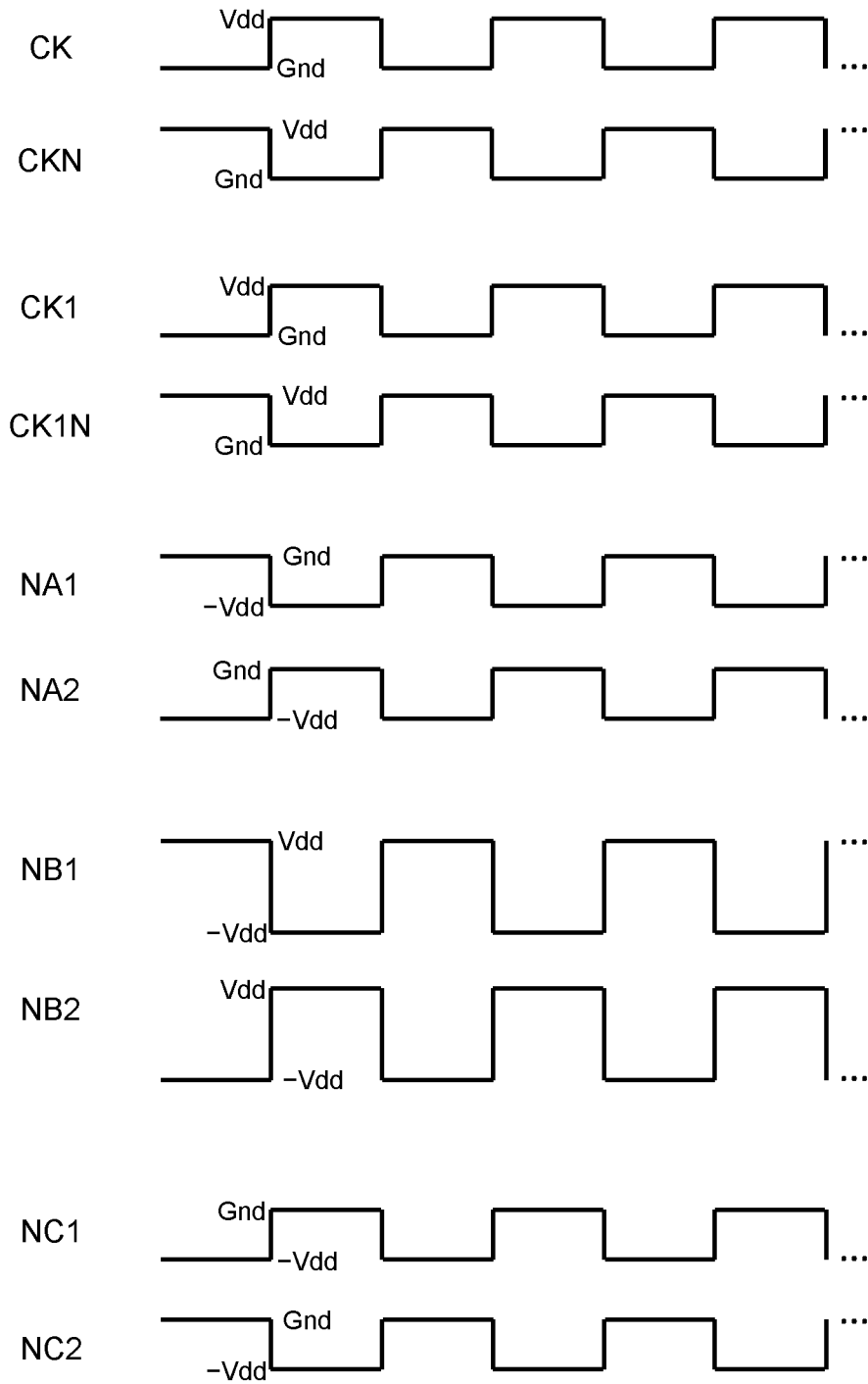
FIG. 3B illustrates operational waveforms for the circuits of FIGS. 2E-2H.

FIG. 3B shows the waveforms for the clock signals CK, CKN, CK1 and CK1N as well as the signals at nodes NA1, NA2, NB1, NB2, NC1 and NC2 for the operation of the circuit 200n of FIG. 2E. It will be noted that, for ease of understanding the operation of the circuit 200n, signal propagation delays are not shown in the FIG. 3B waveforms. It will be further noted that the voltage levels of the clock signals are idealized, and that as implemented the voltages will be substantially equal to (for example, within 1-20%), but not necessarily equal to, the Vdd and −Vdd voltage levels.

The circuitry formed by transistors MP1, MP2, bootstrap capacitors Cbs1, Cbs2 and inverters 206n, 208n is a bootstrapping circuit that functions in response to the clock signals CK, CKN referenced to the power supply Vdd and ground to generate clock signals at nodes NA1, NA2 referenced to −Vdd and ground. When clock signal CKN is logic low (Gnd), the clock signal CK1 output by inverter 208n will be logic high (Vdd). Transistor MP2 turns on because node NA1 is boosted through capacitor Cbs1 to the −Vdd voltage level (i.e., turned on because the gate voltage of transistor MP2 is less than ground at the source terminal by more than Vth) and the bootstrap capacitor Cbs2 is charged to the ground voltage level. In the next phase of the clock signals, the clock signal CKN is logic high and clock signal CK1 output by inverter 208n will be logic low. Transistor MP2 turns off because node NA1 is at the ground voltage level (i.e., turns off because the gate voltage of transistor MP2 is equal to the source voltage ground and thus does not exceed Vth) and the voltage at node NA2 is boosted through the bootstrap ground voltage stored on capacitor Cbs2 to the −Vdd voltage level. A similar process occurs in response to the phases of the clock signals CK and CK1N.

The circuitry formed by the CMOS switching circuits 210n and 212n functions as a level shifting stage to shift the clock signals at nodes NA1, NA2 referenced to −Vdd and ground to generate clock signals at nodes NB1, NB2 referenced to −Vdd and +Vdd. Consider the following with respect to the circuit 212n operation: when clock signal CK is logic high, transistor MP4 is turned on (i.e., because the gate voltage of transistor MP4 is less than the source terminal by more than Vth) and node NB2 is clamped to Vdd. In the next phase of the clock signals, clock signal CK is logic low which causes transistor MP4 to turn off (i.e., because the gate voltage of transistor MP4 is equal to the source voltage ground and thus does not exceed Vth). In that same phase, node NA2 is at the −Vdd voltage level (see, discussion above), and transistor MN2 turns on (i.e., the Vgs of transistor MN2 exceeds the Vth) passing the −Vdd voltage level to node NB1. A similar process occurs with respect to the circuit 210n in response to the phases of the clock signal CKN.

The circuitry formed by capacitor C1, C2 and inverters 216in, 218n functions in response to the clock signals CK1, CK1N referenced to the power supply Vdd and ground to generate clock signals at nodes NC1, NC2 referenced to −Vdd and ground. Consider the following operation with respect to the circuit with capacitor C2 and inverter 218n: when clock signal CK1 is logic low, the output of the inverter 218n is logic high. At the same time, as will be discussed below, transistor MP6 is turned on and the capacitor C2 is discharged to the ground voltage level. In the next phase of the clock signals, clock signal CK1 is logic high, and the output of the inverter 218n is logic low. The voltage at node NC2 is boosted through capacitor C2 to the −Vdd voltage level. A similar process occurs with respect to the circuit with capacitor C1 and inverter 216n in response to the phases of the clock signal CK1N.

The circuitry formed by the CMOS switching circuits 220n and 222n functions as a charge transfer drive stage to selectively pass the −Vdd voltage at nodes NC1, NC2 to the output node 204 in order to drive the capacitive and current load 206. Consider the following with respect to the circuit 222n operation: when clock signals CK and CK1 are both logic low, the voltage at node NB2 is at the −Vdd voltage level and the transistor MP6 is turned on (i.e., the Vgs of transistor MP6 exceeds the Vth) to discharge the capacitor C2 to the ground voltage level. In the next phase of the clock signals, when clock signals CK and CK1 are both logic high, the voltage at node NB2 is at the Vdd level and the transistor MN4 is turned on (i.e., the Vgs of transistor MN4 exceeds the Vth) to pass the −Vdd voltage level at node NC2 to the node 204. A similar process occurs with respect to the circuit 220n in response to the phases of the clock signals CKN and CK1N.

Figure 1B:
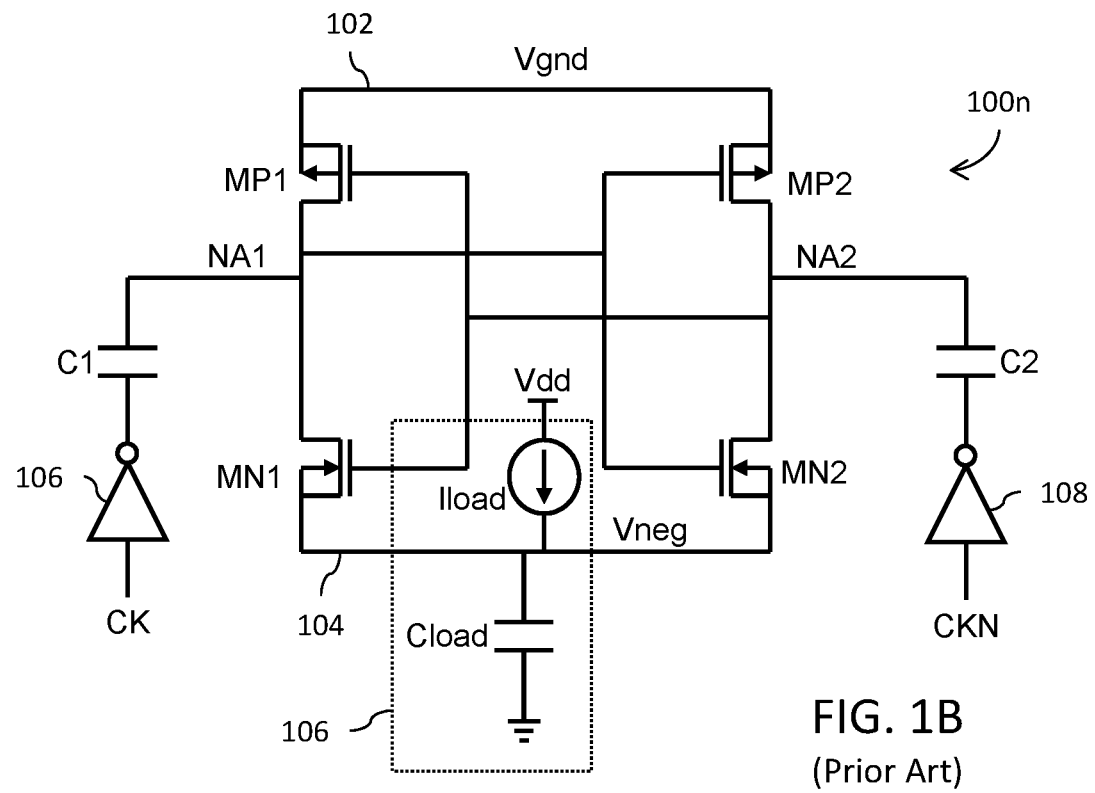
FIG. 1B is a circuit diagram for a negative charge pump circuit.

An advantage of the circuit implementation is an increase in the Vgs of the charge transfer switching transistors in order to reduce the on-resistance (Rds_on). There is a corresponding reduction in the output impedance in comparison to the charge pump circuit of FIG. 1B, for example.

Figure 2F:
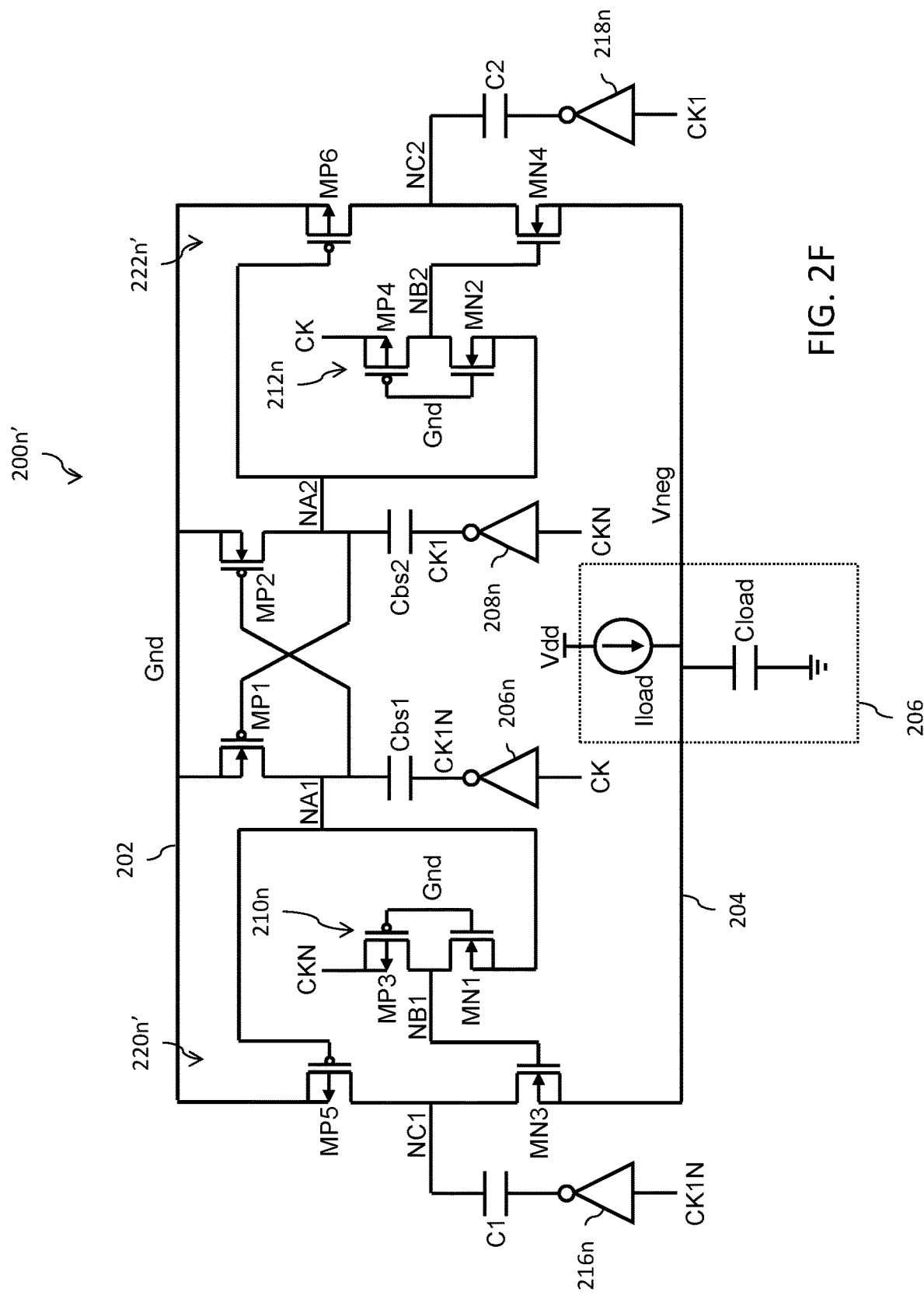
FIG. 2F is a circuit diagram for a negative charge pump circuit.

Reference is now made to FIG. 2F which shows a circuit diagram for a negative charge pump circuit 200n'. Like references refer to like or same components which will not be described again. The circuit 200n' of FIG. 2F differs from the circuit 200n of FIG. 2F in the drive of the CMOS switching circuits 220n' and 222n'. The gate of transistor MN3 is driven by the signal at node NB1, as with the circuit 200n, but the gate of transistor MP5 is driven by the signal at node NA1. The gate of transistor MN4 is driven by the signal at node NB2, as with the circuit 200n, but the gate of transistor MP6 is driven by the signal at node NA2. Operation of the circuit 200n' is like that described for circuit 200n with waveforms as shown in FIG. 3B.

Figure 2G:
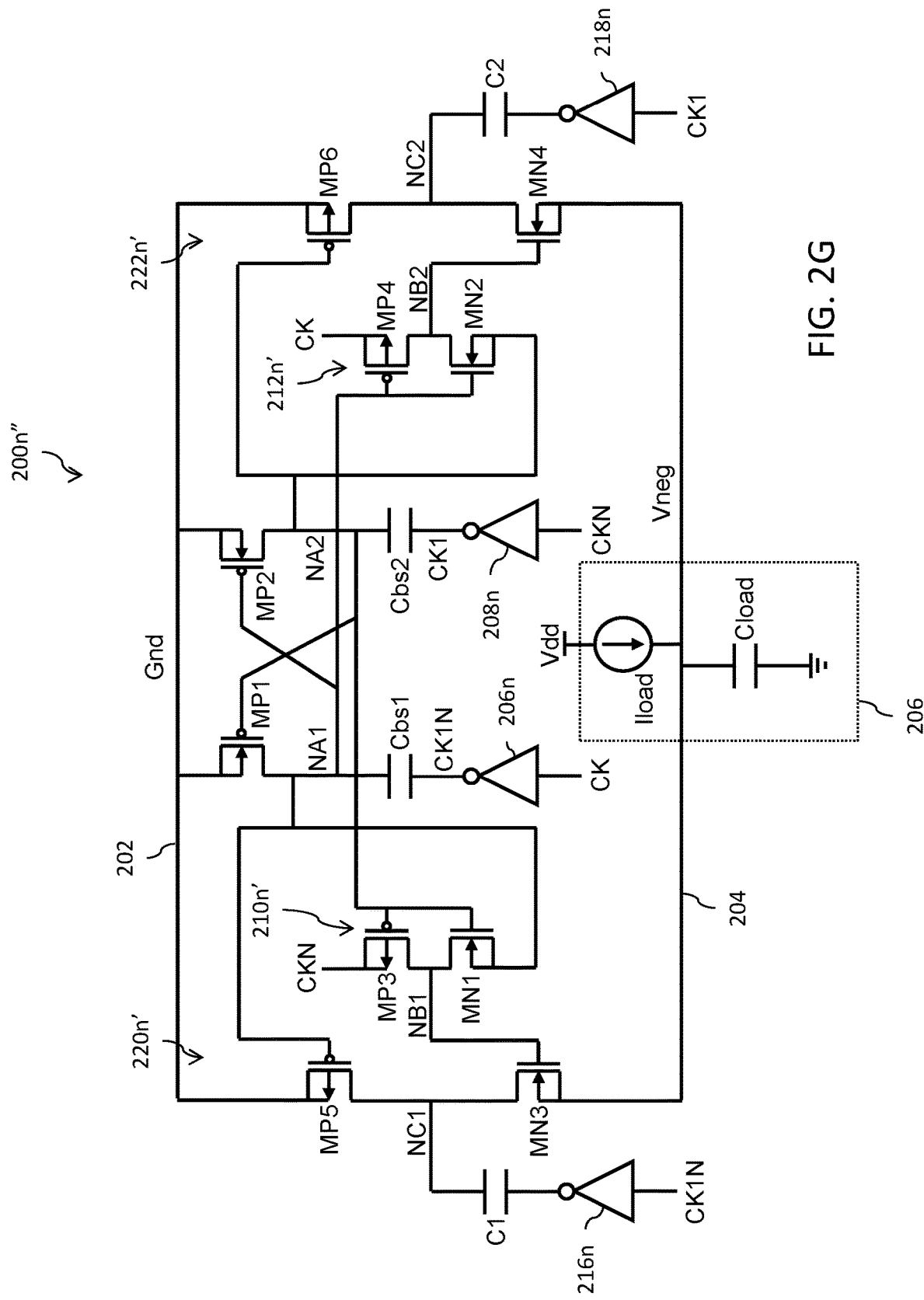
FIG. 2G is a circuit diagram for a negative charge pump circuit.

Reference is now made to FIG. 2G which shows a circuit diagram for a negative charge pump circuit 200n". Like references refer to like or same components which will not be described again. The circuit 200n" of FIG. 2G differs from the circuit 200n' of FIG. 2F in the drive of the CMOS switching circuits 210' and 212'. The gates of transistors MP3 and MN1 are driven by the signal at node NA2. The gates of transistors MP4 and MN2 are driven by the signal at node NA1. Operation of the circuit 200n" is like that described for circuit 200n with waveforms as shown in FIG. 3B.

Figure 2H:
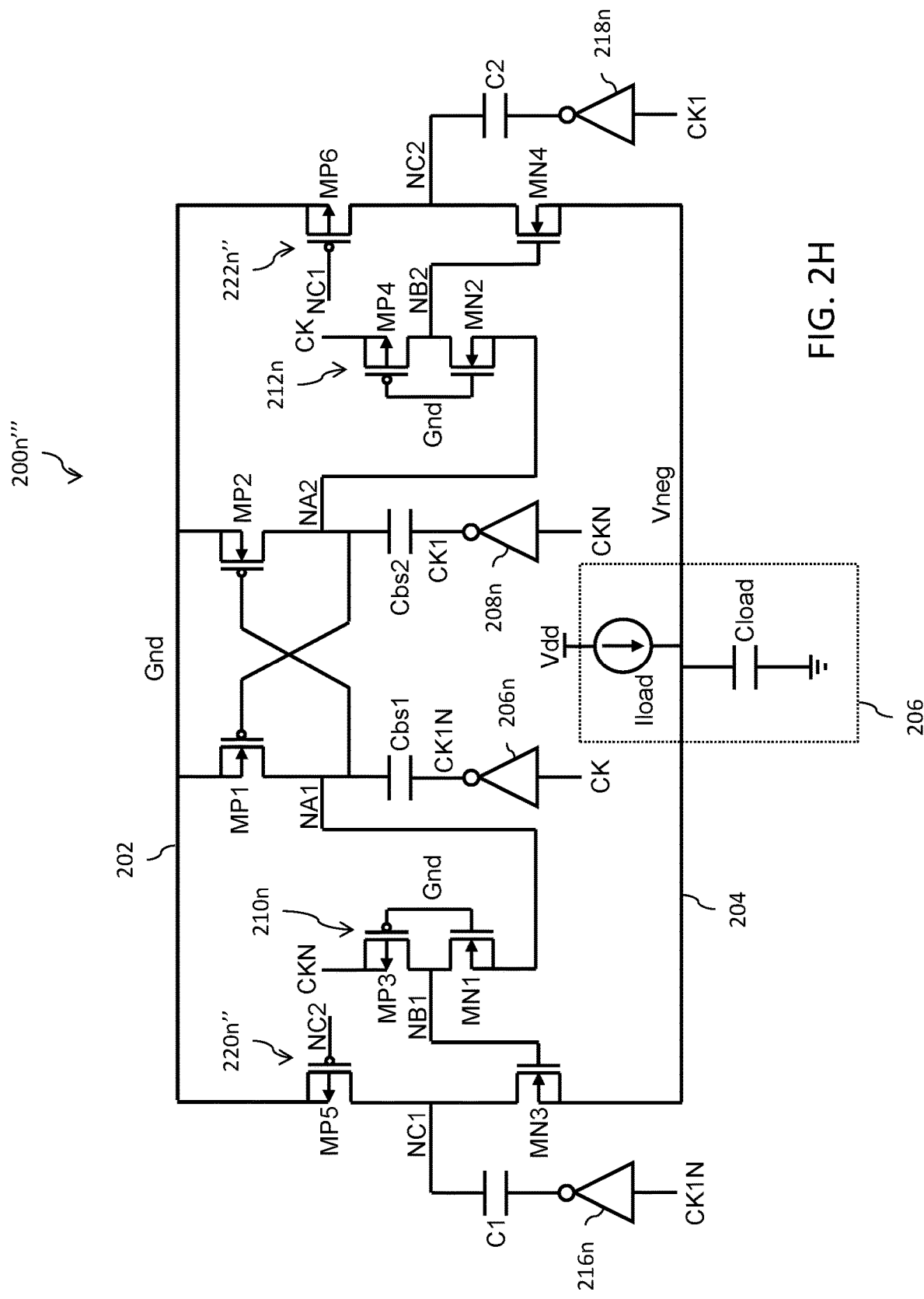
FIG. 2H is a circuit diagram for a negative charge pump circuit.

Reference is now made to FIG. 2H which shows a circuit diagram for a negative charge pump circuit 200n'". Like references refer to like or same components which will not be described again. The circuit 200n'" of FIG. 2H differs from the circuit 200n of FIG. 2F in the drive of the CMOS switching circuits 220" and 222". The gate of transistor MN3 is driven by the signal at node NB1, as with the circuit 200n, but the gate of transistor MP5 is driven by the signal at node NC2. The gate of transistor MN4 is driven by the signal at node NB2, as with the circuit 200n, but the gate of transistor MP6 is driven by the signal at node NC1. Operation of the circuit 200n'" is like that described for circuit 200n with waveforms as shown in FIG. 3B.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A charge pump circuit, comprising:
   first and second intermediate nodes that are capacitively coupled to receive first and second clock signals that are logical inverses of each other, said first and second clock signals oscillating between a ground voltage and a positive supply voltage, the first and second intermediate nodes generating a first signal and a second signal, respectively, that are logical inverses of each other and which oscillate between a first voltage and a second voltage;
   a first level shifting circuit configured to shift the first signal and generate a third signal oscillating between the first voltage and a third voltage;
   a second level shifting circuit configured to shift the second signal and generate a fourth signal oscillating between the first voltage and the third voltage, wherein the third and fourth signals are logical inverses of each other;
   a first CMOS switching circuit including a first transistor having a source node coupled to an input node, a second transistor having a source node coupled to an output node, and wherein a gate node of at least one of the first and second transistors is coupled to receive the third signal, wherein a common drain of the first CMOS switching circuit is capacitively coupled to receive the first clock signal; and
   a second CMOS switching circuit including a third transistor having a source node coupled to the input node, a fourth transistor having a source node coupled to the output node, and wherein a gate node of at least one of the third and fourth transistors is coupled to receive the fourth signal, wherein a common drain of the second CMOS switching circuit is capacitively coupled to receive the second clock signal.

2. The charge pump circuit of claim 1, wherein the gate nodes of both of the first and second transistors are coupled to receive the third signal and wherein the gate nodes of both of the third and fourth transistors are coupled to receive the fourth signal.

3. The charge pump circuit of claim 1, wherein:
   the gate node of the first transistor is coupled to receive the first signal;
   the gate node of the second transistor is coupled to receive the third signal;
   the gate node of the third transistor is coupled to receive the second signal; and
   the gate node of the fourth transistor is coupled to receive the fourth signal.

4. The charge pump circuit of claim 1, wherein:
   the gate node of the first transistor is coupled to receive a signal at the common drain of the second CMOS switching circuit;
   the gate node of the second transistor is coupled to receive the third signal;
   the gate node of the third transistor is coupled to receive a signal at the common drain of the first CMOS switching circuit; and
   the gate node of the fourth transistor is coupled to receive the fourth signal.

5. The charge pump circuit of claim 1, wherein said charge pump circuit is configured for operation as a positive charge pump, and wherein:
   the input node receives the positive supply voltage; and
   the output node generates a positive output voltage that is substantially equal to two times the positive supply voltage.

6. The charge pump circuit of claim 1, wherein said charge pump circuit is configured for operation as a positive charge pump, and wherein:
the input node receives the positive supply voltage;
the first voltage is substantially equal to two times the positive supply voltage;
the second voltage is substantially equal to the positive supply voltage; and
the third voltage is a ground voltage.

7. The charge pump circuit of claim 1, wherein said charge pump circuit is configured for operation as a positive charge pump, and wherein the first and third transistors are n-channel transistors.

8. The charge pump circuit of claim 1, wherein said charge pump circuit is configured for operation as a negative charge pump, and wherein:
the input node receives a ground voltage; and
the output node generates a negative output voltage.

9. The charge pump circuit of claim 1, wherein said charge pump circuit is configured for operation as a negative charge pump, and wherein:
the input node receives a ground voltage;
the first voltage is substantially equal to a negative of the positive supply voltage;
the second voltage is substantially equal to the ground voltage; and
the third voltage is substantially equal to the positive supply voltage.

10. The charge pump circuit of claim 1, wherein said charge pump circuit is configured for operation as a negative charge pump, and wherein the first and third transistors are p-channel transistors.

11. The charge pump circuit of claim 1, further comprising a fifth transistor and a sixth transistor in a cross-coupled configuration, wherein the fifth transistor is coupled between the input node and the first intermediate node and the sixth transistor is coupled between the input node and the second intermediate node.

12. The charge pump circuit of claim 11, wherein said charge pump circuit is configured for operation as a positive charge pump, and wherein the fifth and sixth transistors are n-channel transistors.

13. The charge pump circuit of claim 11, wherein said charge pump circuit is configured for operation as a negative charge pump, and wherein the fifth and sixth transistors are p-channel transistors.

14. A positive charge pump circuit, comprising:
a bootstrap-based level shifting circuit receiving a positive supply voltage at an input node and configured to generate a switching control signal that oscillates between a ground voltage and a boosted positive voltage that is substantially equal to two times the positive supply voltage;
a circuit including an intermediate node capacitively coupled to receive a clock signal oscillating between a ground voltage and the positive supply voltage and configured to generate a signal at the intermediate node that oscillates between a voltage substantially equal to the positive supply voltage and a voltage substantially equal to two times the positive supply voltage; and
a charge transfer switching circuit having a control node driven by the switching control signal and configured to control transfer of charge from the intermediate node to an output node for generating an output voltage that is substantially equal to two times the positive supply voltage.

15. The positive charge pump circuit of claim 14, wherein the charge transfer switching circuit comprises:
a first transistor coupled between the input node and the intermediate node; and
a second transistor coupled between the intermediate node and the output node;
wherein a gate terminal of at least one of the first and second transistor is driven by the switching control signal.

16. The positive charge pump circuit of claim 15, wherein both gate terminals of the first and second transistors are driven by the switching control signal.

17. The positive charge pump circuit of claim 15, wherein the gate terminal of the second transistor is driven by the switching control signal and the gate terminal of the first transistor is driven by a signal generated within the bootstrap-based level shifting circuit which oscillates between the positive supply voltage and the voltage substantially equal to two times the positive supply voltage.

18. The positive charge pump circuit of claim 15, wherein the gate terminal of the second transistor is driven by the switching control signal and the gate terminal of the first transistor is driven by a signal which oscillates between the positive supply voltage and the voltage substantially equal to two times the positive supply voltage.

19. The positive charge pump circuit of claim 15, wherein the first transistor is n-channel and the second transistor is p-channel.

20. A negative charge pump circuit, comprising:
a bootstrap-based level shifting circuit receiving a ground voltage at an input node and configured to generate a switching control signal that oscillates between a ground voltage and a boosted negative voltage that is substantially equal to a negative of a positive supply voltage;
a circuit including an intermediate node capacitively coupled to receive a clock signal oscillating between a ground voltage and the positive supply voltage and configured to generate a signal at the intermediate node that oscillates between a voltage substantially equal to the positive supply voltage and a voltage substantially equal to the negative of the positive supply voltage; and
a charge transfer switching circuit having a control node driven by the switching control signal and configured to control transfer of charge from the intermediate node to an output node for generating an output voltage that is substantially equal to the negative of the positive supply voltage.

21. The negative charge pump circuit of claim 20, wherein the charge transfer switching circuit comprises:
a first transistor coupled between the input node and the intermediate node; and
a second transistor coupled between the intermediate node and the output node;
wherein a gate terminal of at least one of the first and second transistor is driven by the switching control signal.

22. The negative charge pump circuit of claim 21, wherein both gate terminals of the first and second transistors are driven by the switching control signal.

23. The negative charge pump circuit of claim 21, wherein the gate terminal of the second transistor is driven by the switching control signal and the gate terminal of the first transistor is driven by a signal generated within the bootstrap-based level shifting circuit which oscillates between the ground voltage and the voltage substantially equal to the negative of the positive supply voltage.

24. The negative charge pump circuit of claim 21, wherein the gate terminal of the second transistor is driven by the switching control signal and the gate terminal of the first transistor is driven by a signal which oscillates between the ground voltage and the voltage substantially equal to the negative of the positive supply voltage.

25. The negative charge pump circuit of claim 21, wherein the first transistor is p-channel and the second transistor is n-channel.

26. A charge pump circuit, comprising:
an input voltage node;
an output voltage node;
a first intermediate node capacitively coupled to receive a first clock signal;
a second intermediate node capacitively coupled to receive a second clock signal;
a first switching circuit including a first transistor having a source node coupled to receive a first signal at the first intermediate node and a second transistor having a source node coupled to receive a third clock signal, wherein the second clock signal is a logical inverse of the third clock signal;
a second switching circuit including a third transistor having a source node coupled to receive a second signal at the second intermediate node and a fourth transistor having a source node coupled to receive a fourth clock signal, wherein the first clock signal is a logical inverse of the fourth clock signal;
a third switching circuit including a fifth transistor having a source node coupled to the input node, a sixth transistor having a source node coupled to the output node, and wherein a gate node of at least one of the fifth and sixth transistors is coupled to receive a third signal at a common drain of the first switching circuit, wherein a common drain of the third switching circuit is capacitively coupled to respectively receive the first clock signal; and
a fourth switching circuit including a seventh transistor having a source node coupled to the input node, an eighth transistor having a source node coupled to the output node, and wherein a gate node of at least one of the seventh and eighth transistors is coupled to receive a fourth signal at a common drain of the second switching circuit, wherein a common drain of the fourth switching circuit is capacitively coupled to receive the second clock signal.

27. The charge pump circuit of claim 26, wherein the gate nodes of both of the fifth and sixth transistors are coupled to receive the third signal and wherein the gate nodes of both of the seventh and eighth transistors are coupled to receive the fourth signal.

28. The charge pump circuit of claim 26 configured for operation as a positive charge pump.

29. The charge pump circuit of claim 26 configured for operation as a negative charge pump.

30. The charge pump circuit of claim 26, wherein gate nodes of the first, second, third and fourth transistors receive a same voltage.

31. The charge pump circuit of claim 26, wherein:
gate nodes of the first and second transistors are coupled to receive the second signal; and
gate nodes of the third and fourth transistors are coupled to receive the first signal.

32. The charge pump circuit of claim 26, wherein:
the gate node of the fifth transistor is coupled to receive the first signal;
the gate node of the sixth transistor is coupled to receive the third signal;
the gate node of the seventh transistor is coupled to receive the second signal; and
the gate node of the eighth transistor is coupled to receive the fourth signal.

33. The charge pump circuit of claim 32, wherein:
gate nodes of the first and second transistors are coupled to receive the second signal; and
gate nodes of the third and fourth transistors are coupled to receive the first signal.

34. The charge pump circuit of claim 26, wherein:
the gate node of the fifth transistor is coupled to receive a signal at the common drain of the fourth switching circuit;
the gate node of the sixth transistor is coupled to receive the third signal;
the gate node of the seventh transistor is coupled to receive a signal at the common drain of the third switching circuit; and
the gate node of the eighth transistor is coupled to receive the fourth signal.

35. The charge pump circuit of claim 34, wherein the gate nodes of the first, second, third and fourth transistors receive a same voltage.

36. The charge pump circuit of claim 26, further comprising a ninth transistor and a tenth transistor in a cross-coupled configuration, wherein the ninth transistor is coupled between the input node and the first intermediate node and the tenth transistor is coupled between the input node and the second intermediate node.

* * * * *